(12) United States Patent
Giallorenzi et al.

(10) Patent No.: US 6,332,008 B1
(45) Date of Patent: Dec. 18, 2001

(54) SYNCHRONIZER AND METHOD THEREFOR AND COMMUNICATIONS SYSTEM INCORPORATING SAME

(75) Inventors: Thomas R Giallorenzi, Herriman; Samuel C Kingston, Salt Lake City; Robert W Steagall, North Salt Lake; Patrick J Smith, Salt Lake City; Steven T Barham, Taylorsville, all of UT (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 09/170,018

(22) Filed: Oct. 13, 1998

Related U.S. Application Data

(62) Division of application No. 08/872,398, filed on Jun. 10, 1997, now Pat. No. 5,867,525.

(51) Int. Cl.⁷ ........................................................ H04L 7/00
(52) U.S. Cl. ........................ 375/356; 375/130; 375/134; 375/147; 375/137
(58) Field of Search .................................. 375/356, 130, 375/134, 136, 137, 145, 147, 149, 346, 348; 370/320, 342, 350, 335, 336

(56) References Cited

U.S. PATENT DOCUMENTS

| 5,022,048 | 6/1991 | Kingston et al. ........................ 375/1 |
| 5,060,180 | 10/1991 | Kingston et al. ............... 364/724.03 |
| 5,099,494 | 3/1992 | Kingston et al. ........................ 375/1 |
| 5,297,162 | 3/1994 | Lee et al. ................................. 375/1 |
| 5,359,624 | 10/1994 | Lee et al. ................................. 375/1 |
| 5,446,727 | 8/1995 | Bruckert et al. ........................ 370/18 |
| 5,499,236 | 3/1996 | Giallorenzi et al. ................... 370/18 |
| 5,544,155 | 8/1996 | Lucas et al. ............................ 370/18 |
| 5,568,473 | 10/1996 | Hemmati ................................ 370/18 |
| 5,583,853 | 12/1996 | Giallorenzi et al. ................. 370/441 |
| 5,691,974 | 11/1997 | Zehavi et al. .......................... 370/203 |
| 5,737,362 | * 4/1998 | Hyun et al. ............................ 345/206 |
| 5,757,767 | 5/1998 | Zehavi .................................. 370/208 |
| 5,761,239 | 6/1998 | Gold et al. ............................ 375/206 |
| 5,784,366 | 7/1998 | Apelewicz ............................ 370/342 |
| 5,796,776 | 8/1998 | Lomp et al. ........................... 375/222 |
| 5,799,010 | 8/1998 | Lomp et al. ........................... 370/335 |
| 5,838,669 | * 11/1998 | Gerakoulis ............................ 370/320 |
| 5,867,525 | * 2/1999 | Giallorenzi et al. ................. 375/206 |

* cited by examiner

Primary Examiner—Mohammad H. Ghayour
(74) Attorney, Agent, or Firm—Perman & Green, LLP

(57) ABSTRACT

Users or subscribers of a spread spectrum synchronous communications system provide signals to the central station or base unit of that system, and receive signals therefrom. Proper synchronization among those users (and their signals) is needed to ensure proper operation of the system. To ensure proper synchronization among those users, the signal produced by each user is checked for presence and amount of any offset error. This is accomplished by using three despreaders for the signal for each user. For one such user, each such despreader for that user receives the spreading code for that user. However, the spreading code as received by any one such despreader is time-delayed with respect to the spreading code as received by the other two despreaders. Each such despreader receives the spreading code with a different amount of delay imposed on that spreading code. The outputs of the three despreaders are digitally combined (e.g. compared), or compared, to produce the offset estimate for that user. To reduce noise effects, the offset estimate is averaged over a predetermined time duration; alternatively, such averaging can be performed on the outputs of the despreaders, or at some intermediate processing step. The offset estimate is sent to the user, to be used to correct synchronization of that user. Offset estimates that are too small to be useful are squelched and are not so sent to the user, to reduce channel usage and thereby save bandwidth.

17 Claims, 7 Drawing Sheets

SYNCHRONIZER AND METHOD THEREFOR AND COMMUNICATIONS SYSTEM INCORPORATING SAME

This application is a divisional application of Ser. No. 08/872,398 filed Jun. 10, 1997 now U.S. Pat. No. 5,867,525.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

The present invention relates to telecommunications, and more particularly to synchronization of transmitter(s) and receiver(s) at separate stations. The present invention also relates to multiplex communications, and more particularly to channel assignment techniques for combining or distributing information via code word channels using multiple access techniques such as code division multiple access. The present invention further relates to communications such as pulse or digital communications, and more particularly to spread spectrum communications using plural paths or channels, such as direct sequence spread spectrum communications. The present invention still further relates to code division, multiple access (CDMA) communications systems, and more particularly to direct-sequence (DS) synchronous CDMA communications systems.

BACKGROUND OF THE INVENTION

In a code division, multiple access (CDMA) communications system, a plurality of user communication signals can be transmitted within and thus share the same portion of the frequency spectrum. This is accomplished by providing a plurality of different pseudonoise (PN) binary code sequences (e.g., one for each user) that modulate a carrier, thereby "spreading" the spectrum of the resulting waveform. In a given receiver, all of the user signals are received, and one is selected by applying an assigned one of the PN binary code sequences to a correlator to extract only the signal energy intended for the receiver, thereby "despreading" the received CDMA transmission. All other (uncorrelated) user transmissions appear as noise.

In digital spread spectrum communications, data signals such as voice signals are digitized (turned into ones and zeros, or the like) and then there is impressed upon the digitized data a pseudonoise (PN) code, also referred to as a signature sequence. A pseudonoise code is usually a high frequency noise-like waveform that is multiplied with the digitized data before it is transmitted; this has the effect of spreading out the spectrum of the signal, hence the term spread spectrum communications. The spread digitized signal is then transmitted to a receiver, at which the same or a corresponding pseudonoise binary code sequence is applied to the received signal to despread it and extract the digitized signal. The digitized signal can then be digital-to-analog converted to obtain the original voice or other data signal. In a multi-user system, if each user in the system uses a different or distinct pseudonoise or signature sequence code, then at the other end of the link, if that particular noise-like waveform or signature sequence is applied to the received signal, then the data can then be extracted from that one user's signal, and any other user that is using a different noise-like or pseudonoise sequence will look just like background noise.

There are a number of approaches to accomplish such multi-user channelization. In one such approach, frequency division multiple access (FDMA), each user's transmitter has a distinct band of frequency, and the users do not overlap in frequency. The users can thus be distinguished by tuning to the appropriate frequency band. In time division multiple access (TDMA), every user's transmitter gets a specified time slot; all users then share and utilize the entire bandwidth of the selected channel, but each user transmits for only a short period of time and then turns off to let another user turn on. Thus, in TDMA, there is a series of users that take turns one at a time in a round robin fashion sharing the channel. In code division multiple access (CDMA), all of the users transmit all of the time, and can use the entire frequency band, so that the users can overlap both in frequency and in time in the resulting aggregate signal. In CDMA, the different users are identified or distinguished using pseudonoise codes or signature sequences. Every user is given a distinct pseudonoise code or signature sequence. The aggregate signal is the sum of all of the transmitted signals from all of the users with all of the distinct codes and distinct data. As long as the receiver knows the PN code of the user whose signal he is trying to extract from the aggregate signal that he receives, that receiver can then pull out the signal that it is interested in by knowing the PN code and using that PN code to accomplish despreading. At the modulator for each CDMA user, the signal to be transmitted is spread using the PN code, and then at the demodulator that signal is despread by multiplying the aggregate signal by the same PN code that was used at the transmitter.

In an asynchronous CDMA system, a user (also referred to as a subscriber unit) would transmit whenever it wants to, and the receiver (also referred to as a base station) would align its receiver to that incoming signal. Because the subscriber units in an asynchronous CDMA system do not try to coordinate their transmissions, but transmit whenever they want to, the base station will have to align itself with a distinct alignment for each active user's signal. Thus, when the base station is trying to despread each user's signal individually, it will have a different timing offset for every user. On the other hand, in a synchronous CDMA system, signals in the reverse channel (from subscriber unit to base station) are required to arrive with a particular phase alignment. Synchronous CDMA systems are further described in U.S. Pat. No. 5,499,236 issued Mar. 12, 1996 for "Synchronous Multipoint-to-Point CDMA Communication System" by Thomas R. Giallorenzi et al., and in its division U.S. Pat. No. 5,583,853 issued Dec. 10, 1996 for "Synchronous CDMA Transmitter/Receiver" by Thomas R. Giallorenzi et al., each of which is hereby incorporated by reference herein.

In a synchronous CDMA system, it is necessary for the base unit to be synchronized to the incoming signal, yet the delay or the time offset of the incoming signal from any particular subscriber unit is unknown initially because the signals are generated by subscriber units located at unknown respective distances from the base unit, the exact propagation time from each subscriber unit to the base unit is unknown, and the phase alignment of the clock in the subscriber unit that generated a particular signal is also unknown. Accordingly, it is necessary for the base station to initially synchronize itself to the subscriber unit signal or vice-versa. One approach to doing so is by having the base station staggering its clock so that it will align itself in time with the incoming signal. However, the inaccuracy caused by this approach in accomplishing initial synchronization and acquisition is undesirable. Another approach is that of U.S. Pat. No. 5,446,727 issued Aug. 29, 1995 for "Method and Apparatus for Time Aligning Signals for Reception in a Code-Division Multiple Access Communication System" by Eugene J. Bruckert et al. In U.S. Pat. No. 5,446,727, a coherent reverse channel, a per-chip spreading function, orthogonal spreading functions and a time alignment of all traffic channels are implemented such that the main signal of each channel arrives at a base-station within a fraction of a chip of one another. With this, the orthogonality among all channels is supposedly maintained, and, when demodulated, supposedly all channels except the channel of interest provides a cross-correlation of substantially zero with respect to the remaining signals. In U.S. Pat. No. 5,446,727, a multiplicity of local despreaders, each delayed relative to each other, are apparently provided. The outputs of all of these receivers are examined, and the receiver with the most power at the output is assumed to be the one that is most accurately synchronized with the received signal. The offset of the received signal is estimated as being equal to the delay carried by that particular receiver component. However, accuracy of this system is determined by the number of such relatively delayed receivers that are used, and the number of delayed receivers used thereby increases the amount of hardware needed for synchronization. Thus, the approach of U.S. Pat. No. 5,446,727 can only estimate the phase offset to within an accuracy equal to the spacing of their receivers in time. Thus, the only way that an arbitrarily good offset estimate could be obtained using the approach of U.S. Pat. No. 5,446,727 is to have an arbitrarily large number of receivers dedicated to each user, which is impractical.

Thus, there is a need to estimate offset in phase, time and/or frequency between a signal produced by a transmitter in one location and the clock of a receiver in another location. The present invention fulfills this need.

SUMMARY OF THE INVENTION

Accordingly, an object of the present invention is to provide apparatus and method for providing an arbitrarily accurate estimate of timing offset between a transmitter of data and a receiver of same.

Another object of the present invention is to provide a timing control loop capable of synchronizing users' signals to within a very small fraction of a chip and providing, as a result, a very high degree of orthogonality among the users of a multi-user communication system.

A further object of the present invention is to provide apparatus and method for providing an arbitrarily accurate estimate of timing offset between a transmitter of data and a receiver of same using a relatively small amount of feedback channel bandwidth.

Briefly, these and other objects of the present invention are accomplished by novel apparatus and method employing an early-late gate discriminator that permits the timing offset to be estimated to an arbitrary degree of precision, depending on the integration time of the offset estimation accumulator. A control loop that synchronizes the transmissions of many users so that they arrive at a base station within a fraction of a chip time of each other is thereby provided.

Other objects, advantages and novel features of the invention will become apparent from the following detailed description of the invention when considered in conjunction with the accompanying drawings.

DETAILED DESCRIPTION

Figure 1:
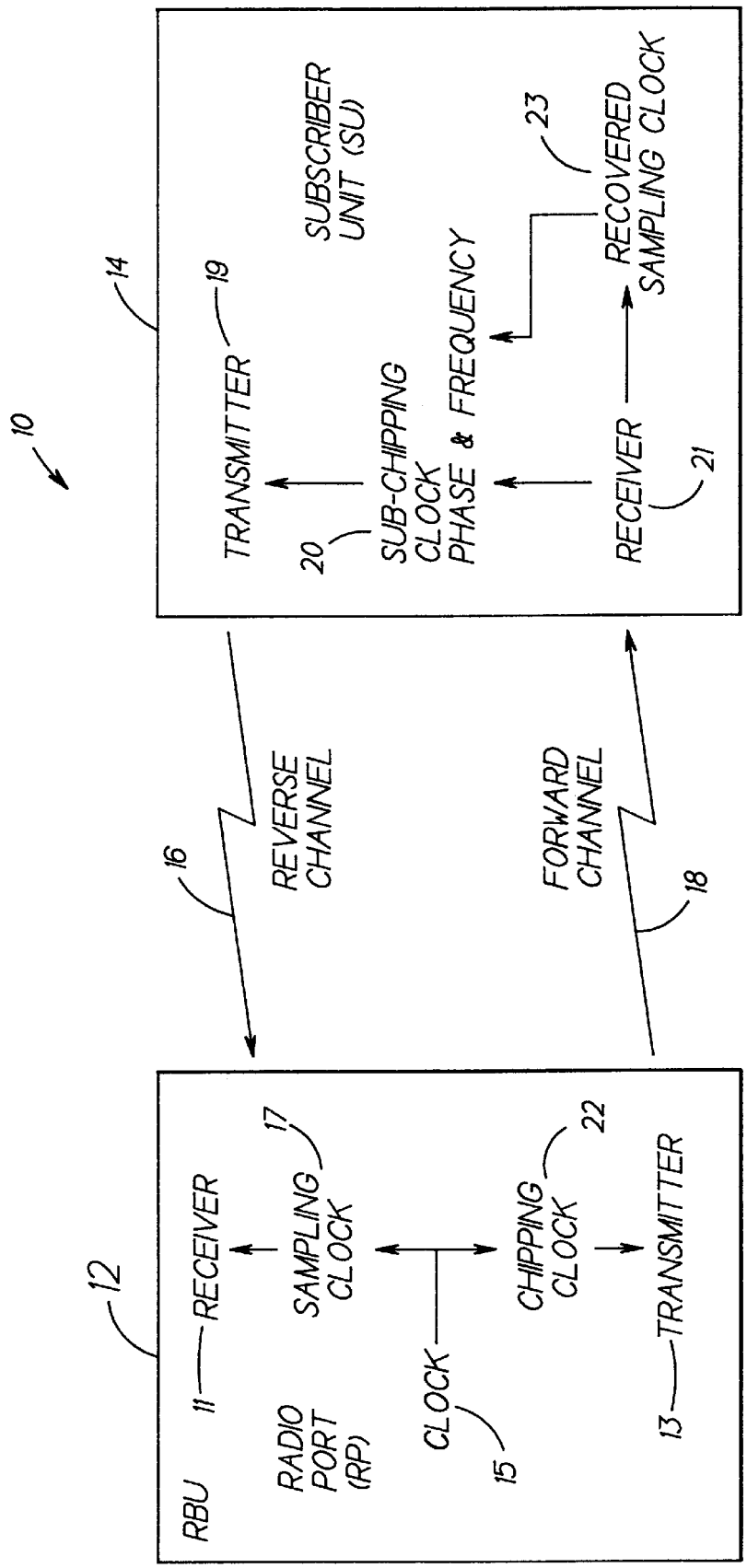
FIG. 1 is a simplified block diagram of a communications system.

Referring now to the drawings, wherein like reference characters designate like or corresponding parts throughout the several views, there is shown in FIG. 1 a simplified block diagram of a synchronous CDMA fixed wireless loop (FWL) single telephone connection, emphasizing the timing clocks of modems at each end of that connection. FIG. 1 is for a CDMA fixed wireless loop system; however, the present invention can be used with other synchronous systems other than FWL systems, although synchronous CDMA is particularly preferred. System 10 of FIG. 1 includes radio base unit (RBU) 12, also referred to as a radio port (RP), and subscriber unit (SU) or user 14, linked by reverse channel 16 and forward channel 18. A local loop provides the service connection between a telephone subscriber in a local geographic area, and the central office, for that area, of a telephone system. Beyond the local loop, from the central office out, is part of the public switched telephone network which is where all of the telephone signals are combined and are transmitted together from place to place (e.g., from city to city). In a wireless local loop system, the telephone lines that would otherwise provide the connection to and from a home, business or other subscriber, are replaced by a wireless system. RBU 12 includes receiver 11, transmitter 13, clock 15, sampling clock 17 and chipping clock 22. Clock 15 is used to generate sampling clock 17 and chipping clock 22. Sampling clock 17 clocks RBU receiver 11. Chipping clock 22 clocks RBU transmitter 13. Subscriber unit 14 includes transmitter 19, receiver 21, recovered sampling clock 23 and sub-chipping clock 20. Clock 20 is used to clock SU transmitter 19. Phase of clock 20 is controlled by SU receiver 21. Frequency of clock 20 is controlled by clock 23, which recovers the RBU chipping clock 22 signal from SU receiver 21. RBU transmitter 13 transmits to SU receiver 21 on forward channel 18. SU transmitter 19 transmits to RBU receiver 11 on reverse channel 16. Although only one subscriber unit 14 is shown in FIG. 1, it should be understood that a single RBU can handle a plurality of subscriber units. Timing coherence for all users is needed in order to maximize the number of users in system 10. That means that in order to ensure low cross correlation between multiple subscriber units, all subscriber units' PN epochs must occur at nearly the same instant in time at the RBU. For this to happen, one must force each subscriber unit's transmitter chipping clock 20 to be coherent (phase locked) with the RBU's chipping clock 22. Additionally, there are delay variations that occur between subscriber unit 14 and RBU 12 that must be taken into consideration. Timing jitter for system 10 is important. Timing error estimates made at the RBU's receiver 11 are used to adjust the subscriber unit's PN clock phase.

Figure 1A:
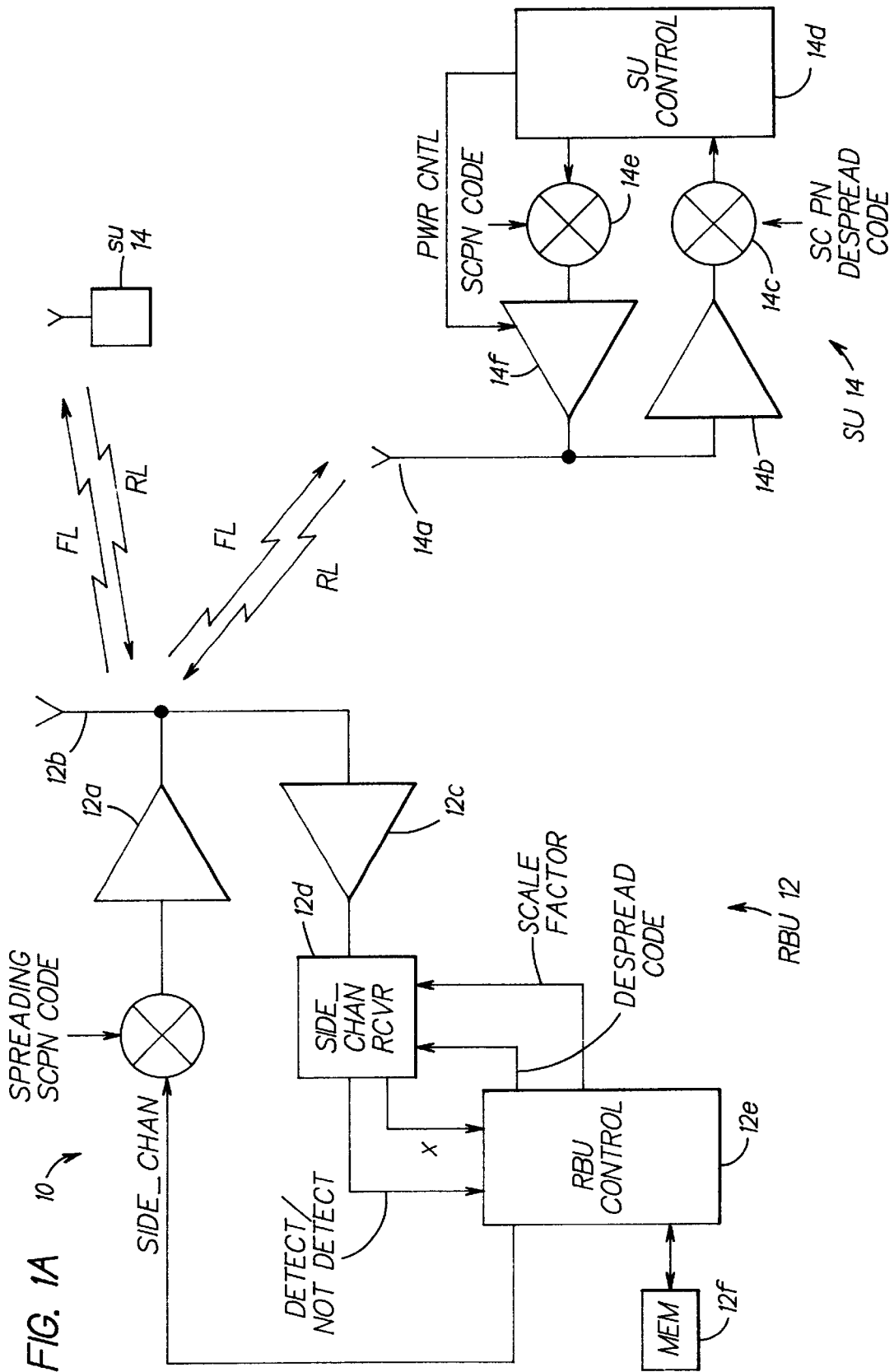
FIG. 1A is another simplified block diagram of the communications system of FIG. 1.

FIG. 1A is a simplified block diagram also of a synchronous, DS-CDMA communications system 10 in accordance with this invention, the system having a radio base unit (RBU) 12 and a plurality of transceiver or subscriber units (SUs). The RBU transmits a side channel to the SUs, and also receives an essentially asynchronously transmitted side channel from the SUs. FIG. 1A shows other features of synchronous CDMA communications system 10, which in presently preferred embodiments of this invention is embodied as a fixed wireless loop system (FWL), is considered herein to be a CDMA system wherein forward link (FL) transmissions from a radio base unit (RBU) 12 for a plurality of transceiver units, referred to herein as user or subscriber units (SUs) 14, are bit and chip aligned in time, and wherein the SUs 14 operate to receive the FL transmissions and to synchronize to one of the transmissions. Each SU 14 also transmits a signal on a reverse link (RL) to RBU 12 in order to synchronize the timing of its transmissions to the RBU, and to generally perform bidirectional communications. The synchronization aspect is of most concern to the teaching of this invention. The FWL is suitable for use in implementing a telecommunications system that conveys voice and/or data between the RBU 12 and the SUs 14.

RBU 12 includes circuitry for generating a plurality of user signals (USER_1 to USER_n), which are not shown in FIG. 1A, and an asynchronous side channel (SIDE_ CHAN) signal that is continuously transmitted. Each of these signals is assigned a respective PN spreading code and is modulated therewith before being applied to a transmitter 12a having an antenna 12b. When transmitted on the FL, the transmissions are modulated in phase quadrature, and the SUs 14 are assumed to include suitable phase demodulators for deriving in-phase (I) and quadrature (Q) components therefrom. The RBU 12 is capable of transmitting a plurality of frequency channels. By example, each frequency channel includes up to 31 code channels, and has a center frequency in the range of 2 GHz to 3 GHz.

RBU 12 also includes a receiver 12c having an output coupled to a side channel receiver 12d. The side channel receiver 12d receives as inputs the spread signal from the receiver 12c, a scale factor signal, and a side channel despread PN code. These latter two signals are sourced from a RBU processor or controller 12e. The scale factor signal can be fixed, or can be made adaptive as a function of a number of SUs 14 that are transmitting on the reverse side channel. The side channel receiver 12d outputs a detect/not detect signal to the RBU controller 12e for indicating a detection of a transmission from one of the SUs 14, and also output a power estimate value X. A read/write memory (MEM) 12f is bidirectionally coupled to the RBU controller 12e for storing system parameters and other information, such as SU timing phase information and power estimate values.

In FIG. 1A, each SU 14 includes an antenna 14a, a receiver 14b, a correlator 14c wherein the received FL transmission is despread using, by example, the side channel despreading PN code, and a SU processor or controller 14d. The SU controller 14d is responsible for managing the operation of the SU 14. These management functions include generating a variable local oscillator (LO) signal for down-converting a received FL signal, and providing the PN binary code sequences that are assigned to the SU 14 for despreading the side channel and also the user's signal. The SU 14 also includes a spreading circuit 14e for spreading a signal, such as the side channel signal, and a transmitter 14f for transmitting the DS-CDMA signal on the RL to the RBU 12.

For the presently preferred embodiments of this invention, the antennas 12b and 14a have a line-of sight relationship, the SUs 14 are fixed in location with respect to the RBU 12, and the antennas 12b and 14a are boresighted during installation of the SU 14. However, the teachings of this invention are not limited to only this particular presently preferred arrangement.

It is preferred that coarser synchronization is accomplished in the manner described in U.S. patent application Ser. No. 08/606,285 filed Feb. 23, 1996 for "A Multi-User Acquisition Procedure for Multipoint-to-Point Synchronous CDMA Systems" by Samuel C. Kingston et al., or in U.S. patent application Ser. No. 08/606,378 filed Feb. 23, 1996 for "A Multi-User Acquisition Procedure for Point-to-Multipoint Synchronous CDMA Systems" by Samuel C. Kingston et al., each of which is hereby incorporated by reference herein.

Figure 2:
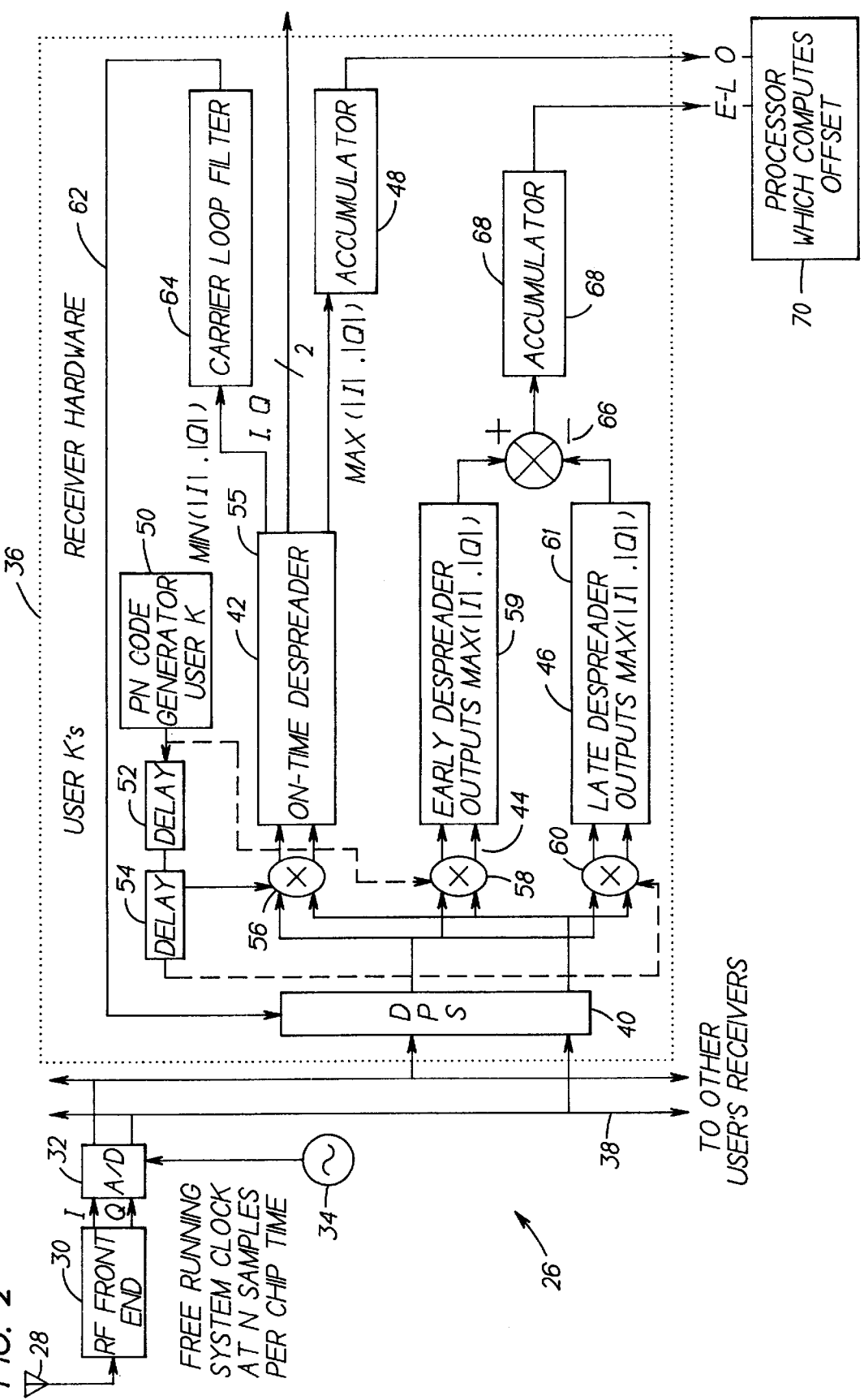
FIG. 2 is a block diagram of a portion of a receiver for a multi-user communications system according to the present invention.

FIG. 2 illustrates simplified RBU receiver hardware for an RBU 26 which can serve as RBU 12 of FIG. 1 and FIG. 1A. FIG. 2 illustrates a portion of RBU 26 which handles one user or subscriber unit, hereinafter referred to as user k. In FIG. 2, the timing offset estimator for each user operates on a stream of samples of the aggregate CDMA received signal. In FIG. 2, the aggregate CDMA waveform from the various users is received at antenna 28 and is received and down-converted by radio frequency (RF) front end 30 to near baseband. RF front end 32 produces the downconverted aggregate waveform as both in-phase (I) and quadrature phase (Q) outputs. RF front end 30 can for example be as described in U.S. Pat. No. 5,060,180 issued Oct. 22, 1991 for "Programmable Digital Loop Filter" by Samuel C. Kingston et al., U.S. Pat. No. 5,022,048 issued Jun. 4, 1991 for "Programmable Digital Frequency-Phase Discriminator" by Samuel C. Kingston et al., or U.S. Pat. No. 5,099,494 issued Mar. 24, 1992 for "Six Channel Digital Demodulator" by Samuel C. Kingston et al., each of which is hereby incorporated by reference herein; FIG. 1 of each of these patents is particularly noted. The received aggregate waveform produced by RF front end 30 is then sampled and quantized by analog-to-digital (A/D) converter 32. The aggregate waveform produced by RF front end 30 is then sampled and quantized by analog-to-digital converter 32 which is clocked by oscillator 34. Oscillator 34 is free running in the sense that it is not controlled by a chip synchronization loop for any user in the system. The sample rate for A/D 32 is N samples per chip time. In the following discussion, the A/D sample rate is set to N=2; however, it should be understood that N can be a positive integer other than 2.

The N samples per chip from A/D 32 are fanned out to every receiver 36 in RBU 26 via bus 38. Although only one such receiver 36 is illustrated in FIG. 2, it should be understood that the present invention can be utilized with a plurality of users or subscriber units. In the following discussion, it will be assumed that user k is being referred to. Nonetheless, there will be a separate receiver 36 for handling the signal from each user or subscriber unit, and each such receiver 36 will operate in a similar manner. Analog-to-digital converter 32 provides the digitized aggregate waveform to receivers 36 via bus 38. Each receiver 36 uses every sample of the aggregate waveform off bus 38 to detect the transmitted bit for the user of interest, as well as to estimate the timing offset of that user. As with RF front end 30, A/D converter 32 produces in-phase (I) and quadrature phase (Q) outputs. In receiver 36, the in-phase (I) and quadrature phase (Q) samples from bus 38 are rotated with a digital phase shifter (DPS) 40 and then despread using the PN code for user k in the RBU receiver 36 for user k. Three despreaders 42, 44 and 46 are used for this purpose. In addition to despreading the signal with an on-time PN code using on-time despreader 42, the sampled signal from DPS 40 is also despread with an early PN code at early despreader 44 and a late PN code at late despreader 46. This is accomplished in the following manner. The PN code for user k is generated by PN code generator 50. The PN code from generator 50 is provided to delay 52. The delayed PN code produced by delay 52 is provided to and further delayed by delay 54. DPS 40 provides the phase shifted I and Q samples in parallel to multipliers 56, 58 and 60. The undelayed PN code produced by generator 50 is provided to multiplier 58, which is used for the early despreading, and whose output is provided to processor 59. The delayed PN code produced by delay 52 is provided to multiplier 56, which is used for the on-time despreading, and whose output is provided to processor 57. The further delayed PN code produced by delay 54 is provided to multiplier 58, which is used for the late despreading and whose output is provided to processor 59. Each multiplier 56, 58 and 60 multiplies the received phase shifted signal from DPS 40 with the PN code that it receives, and provides the multiplied signal to the corresponding processor (57, 59 or 61, respectively). Multipliers 56, 58 and 60 can be identical. Despreaders 42, 44 and 46 can be identical. Despreader 42 includes multiplier 56 and processor or accumulator 57. Despreader 44 includes multiplier 58 and processor or accumulator 59. Despreader 46 includes multiplier 60 and processor or accumulator 61. A portion of the output of on-time despreader 42 is provided to a carrier lock loop 62 including carrier loop filter 64 whose output is provided to control DPS 40. Because DPS 40, under control of carrier lock loop 62, rotates the received signal from bus 38 to the 0, 90, 180 and 270 degree axes, processors 57, 59 and 61 each output the absolute value of the larger of the I and Q signals that they respectively receive. The output of late despreader 46 is then subtracted by adder 66 from the output of early despreader 44, and the result is then accumulated in accumulator 68 over M symbol intervals. M can be any integer, for example 512. Accumulator 42, and accumulator 68, can each operate as a sliding window integrator, or more preferably can operate as an integrate and dump accumulator. The output of on-time despreader 42 provides the on-time despread signal received from user k, which may contain data to be used by RBU 26. The output of on-time despreader 42 is also provided to accumulator 48, which averages that signal to reduce effects of noise and the like. Accumulator 68 averages the difference between the early despread signal and the late despread signal, also to reduce effects of noise and the like. The output E−L (early minus late) of accumulator 68 is then sent to system processor 70 along with output O (on-time) of accumulator 48 for on-time despreader 42. Processor 70 then uses the E−L and O outputs of the early-late timing offset estimation hardware of receiver 36 to determine the offset of the received signal for user k.

Because DPS 40, under control of carrier lock loop 62, rotates the received signal from bus 38 to the 0, 90, 180 and 270 degree axes, processor 57 also outputs, and provides to loop filter 64, the absolute value of the smaller of the I and Q signals that processor 57 receives. Processor 57 also produces or passes through the I and Q signals produced by multiplier 56.

Figure 3:
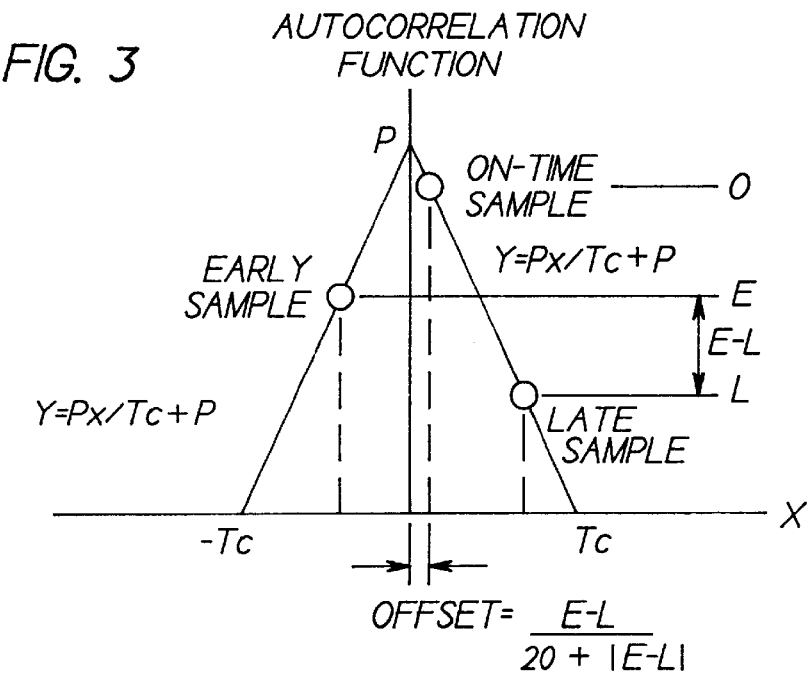
FIG. 3 illustrates an average autocorrelation function for an unfiltered pseudonoise code, illustrating operation of the system of FIG. 2.

FIG. 3 illustrates an average autocorrelation function for an unfiltered PN code. The on-time sample, early sample and late sample are denoted O (on-time), E (early) and L (late) respectively. FIG. 3 illustrates a case where the waveform for user k is not filtered. In this unfiltered case, the average autocorrelation function of the received signal will have a triangular shape as shown in FIG. 3. Because the received signal strength for user k's signal is not exactly known, knowledge of the difference between the early and late samples (E−L) alone is not sufficient to determine the offset. As a result, it is necessary to use the on-time sample as well as to infer the height of the triangle of FIG. 3 and thus to determine the offset accurately. The peak of the autocorrelation triangle of FIG. 3 is denoted by the number P. The offset is given by offset equals $((P-O)T_c)/P$ (in seconds), and P equals O+(absolute value (E−L))/2, implying that the offset given as a fraction of a chip is (E−L)/(2O+(absolute value (E−L))). This expression is only appropriate for the case of unfiltered PN codes, but it provides an example of how the offset can be estimated for any filtering, i.e. the expressions for other cases can be determined in a similar fashion.

Figure 4:
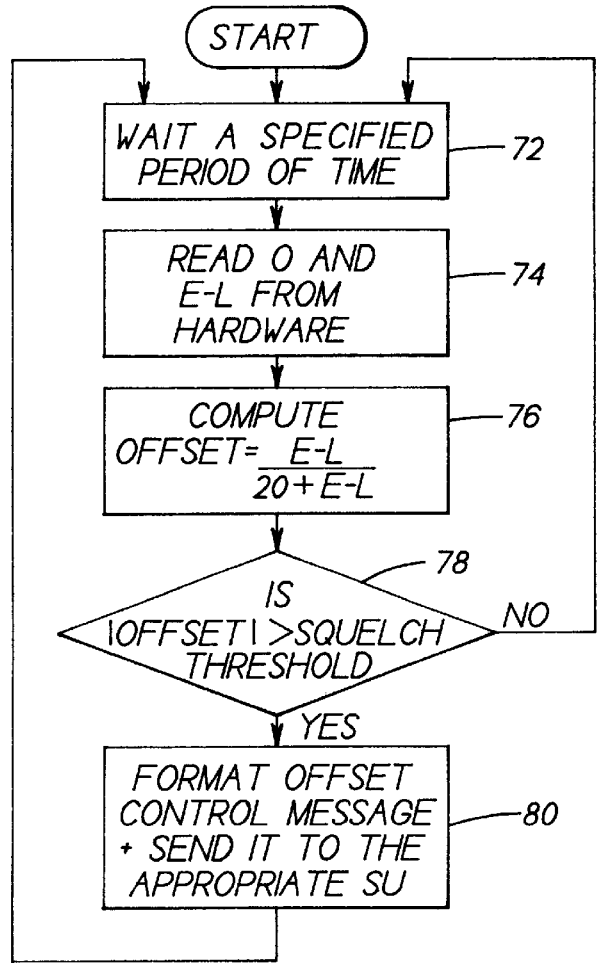
FIG. 4 illustrates a portion of the operation of the system of FIG. 2.

Given below is an example of a derivation of the offset formula for an unfiltered transmission case. A similar derivation could be performed for filtered cases as long as the filtering function is known. The function of the left side of the triangle of FIG. 3 can be expressed as $y(x)=((P/T_c) x)+P$. The function of the right side of the triangle of FIG. 3 can be expressed as $y(x)=((-P/T_c) x)+P$. P is the amplitude of the autocorrelation peak. Defining $\tau$ as the offset between on-time sample O and zero delay, the early sample E has a value of $E=((P/T_c)((-T_c/2)+\tau))+P$. The late sample L has a value of $L=((-P/T_c)((T_c/2)+\tau))+P$. The on-time sample O has a value of $O=((-P/T_c)(\tau))+P$. Thus, Offset=$\tau/T_c$=$(2P\tau/T_c)/2P$=$[((-P/T_c)(T_c/2))+(P\tau/T_c)+P+((P/T_c)(T_c/2))+(P\tau/T_c)-P]/[(-2P\tau/T_c)+2P+(\text{absolute value }((-P/T_c)(T_c/2))+(P\tau T_c)+P+((P/T_c)(T_c/2))+P\tau/T_c)-P))][((P/T_c)((-T_c/2+\tau)+P-(((-P/T_c)((T_c/2)+\tau))+P)]/[(2(((-P/T_c)(\tau))+P))+(\text{absolute value}(((P/T_c)((-T_c/2)+\tau))+P-((-P/T_c)((T_c/2)+\tau)+P))]=(E-L)/2O+(\text{absolute value (E−L)))$ Turning now to FIG. 4, once the timing offset is determined for user k in the manner described above, the timing offset so found is compared to a pair of thresholds around zero (or around some other suitable base value) to determine if this offset of the user is large enough to warrant sending the offset estimate to user k over the forward control channel 18. It is undesirable to send a timing offset message to every user every time that an offset is determined, because in the anticipated steady-state operation of system 10 and of RBU 26, the offsets of the users will be relatively small, say 1/128 of a chip for example. Because small timing offsets are usually tolerable (such as offsets smaller than plus or minus 1/32 chip), it is not worth expending the forward control channel 18 bandwidth involved in sending these small timing corrections. For this reason, small timing offset estimates indicated in the matter shown in FIG. 4 and only offsets larger than the squelch values (such as offsets greater than plus or minus 1/32 chip) will actually be transmitted to the appropriate subscriber unit. This squelching operation can save a substantial amount of system control bandwidth under normal circumstances when compared to other techniques of conveying the timing control loop feedback information, such as dedicating some number of bits per unit time to timing control regardless of the offset of the user. This checking, and if necessary squelching, of offset estimates are accomplished in the manner shown in FIG. 4. In FIG. 4, at step 72 the method waits a specified period of time. Next, at step 74, the value of O, and the value of E minus L, is read from RBU 26. Next, at step 76 the value of the offset is determined. Next, at step 78 it is determined whether the absolute value of the offset found in step 76 exceeds a preset squelch threshold; in other words, it is determined whether the offset found in step 76 exceeds a range of plus or minus a predetermined amount about zero or some other base value. If not, then the method returns to wait step 72. Otherwise, the method proceeds to step 80, at which an offset control message is formatted and sent to the appropriate subscriber unit. After step 80, the method returns to wait step 72. This method is accomplished in processor 70.

If it is determined that the timing offset estimate lies outside of the predetermined squelch region, then the timing offset estimate is formatted appropriately (such as in an eight-bit format where one bit represents the sign of the offset and the remaining seven bits represent the offset magnitude in units of $\frac{1}{128}$ chip, for example), and is then sent across the forward control channel 18 to the appropriate or corresponding subscriber unit. This timing control command can if desired be weighted by a scale factor prior to transmission in order to achieve desirable properties of the overall timing control loop, such as a dampening of the loop. As an example, if the offset estimation circuitry of RBU 26 estimates the user's offset at minus $\frac{1}{16}$ chip, then the command may be sent to the user to adjust its transmit clock forward by $\frac{1}{32}$ chip, rather than $\frac{1}{16}$ chip. This dampening may be desirable in some cases.

The subscriber unit k (or other subscriber unit) will, upon receipt of the timing control command from RBU 26, make a phase adjustment to its transmit clock by the specified amount. Within the practice of the present invention, the subscriber unit can itself apply a dampening factor to the correction in addition to or instead of applying this dampening factor at RBU 26. The next iteration of the timing control loop in RBU 26 can be delayed for a sufficient time to ensure that the subscriber unit has made the last timing adjustment, although this is not absolutely necessary. At that time, RBU 26 will initiate another integrate and dump (or, for example, another sliding window integration) timing offset accumulation for the user (here user k) of interest and again send to that subscriber unit an update if the resulting new offset estimate is not within the squelch region. As stated above, this process is preferably performed simultaneously or in parallel for each user or subscriber unit.

In the above embodiment, the subscriber unit creates its clock by locking to and tracking a signal on the forward channel and deriving the transmit clock from the extracted forward channel clock (i.e. chip clock, bit clock, carrier clock, etc.) as described in the above-cited U.S. Pat. No. 5,499,236. The timing control loop scheme described above also assumes that the users or subscriber units have already aligned themselves with the clock of the RBU to within a fraction of a chip using the acquisition techniques described in U.S. patent application Ser. No. 08/606,378 and/or U.S. patent application Ser. No. 08/606,285, both cited and incorporated by reference above.

In RBU 26, with the timing control discriminator based upon the early-late gate circuit, the estimation error can be driven to an arbitrarily small value as long as the system is not mobile. This is because the accumulation time in the system of RBU 26 can be increased to an arbitrarily large value, thereby reducing the estimation error. If the system is mobile, then the accumulation time will have to be traded off against the loop update rate which is necessary to maintain stability. In contrast, the approach in U.S. Pat. No. 5,446,727 cited above is not capable of estimating the offsets of the users to any more accuracy than the delay spacing of the correlators of that patent, regardless of the level of mobility of the system. Thus, the approach of FIGS. 2–4 represents a significant improvement over that of U.S. Pat. No. 5,446,727.

Figure 5:
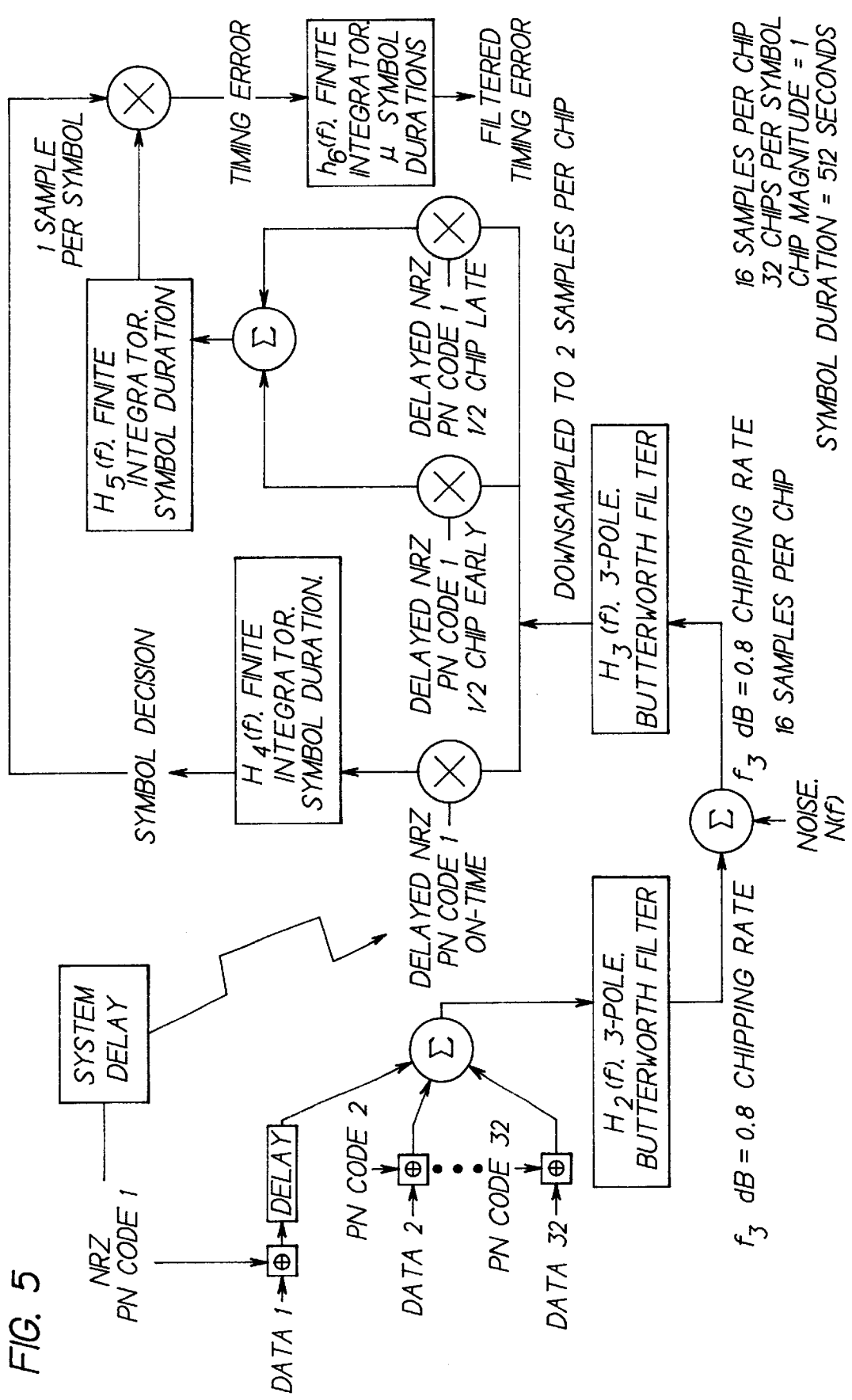
FIG. 5 shows an alternative to a portion of the system of FIG. 2.

An alternative embodiment to RBU 26 is shown in FIG. 5. FIG. 5 shows an early/late correlator for a CDMA system employing 32 users. The system of FIG. 5 results from a simulation of the system of FIG. 2 using 3-pole Butterworth filters having a relative frequency of 0.8, and having 32 simultaneous users. That simulation treats the system of FIG. 2 as an uncoded baseband antipodally modulated system, rather than as a convolutionally encoded, carrier spread QPSK (quadrature phase shift keying) system, for simplicity.

Figure 6:
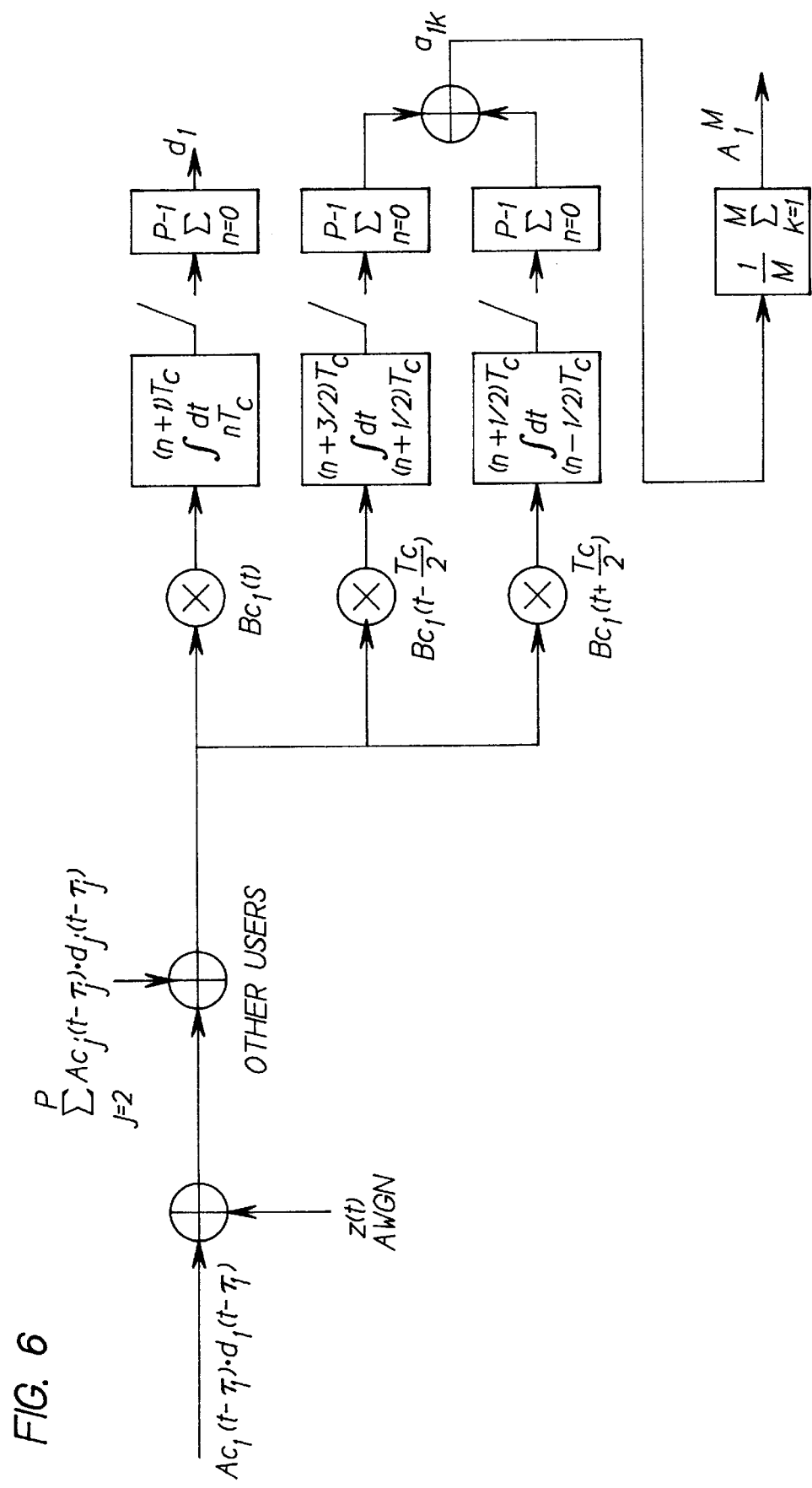
FIG. 6 shows another alternative for a portion of the system of FIG. 2.

FIG. 6 shows another alternative to RBU 26. FIG. 6 is a mathematical model of the matched filter and early-late gate synchronizer of FIG. 2, shown for a single user 1. However, the decision feedback procedure of loop 62 is not shown in FIG. 6.

Processor 70 can for example be a programmable processor such as a programmable digital computer. An example of software implementing squelch step 78 of the flowchart of FIG. 4 is given below in the C software programming language.

```
void process_timing_offset(ULONG which){
    register LONG EL;        /* temp value for calculation */
    register LONG lDenom;    /* temp value for calculation */
    register BYTE chips;     /* timing offset (in chips) */
```

```
EL=first_timing[which]-last_timing[which];
lDenom=(((ULONG)last_corr[which])<<1)+labs(EL);
    if (EL==0) chips=0;
else {
    EL=((EL<<8)/lDenom);
    if (EL>0x7f) chips=0x7f;
    else if (EL<-0x7f) chips=0x81;
    else chips=(BYTE)EL;
}
/*now for control loop tweaking parameters*/
if ((chips<TIMING_SQUELCH)&&(chips>-TIMING_
    SQUELCH)) chips=0;
else chips=(chips*TIMING_DAMP_MULT)
    >>TIMING_DAMP_SHIFT;
```

```
            /* Send info to 486 */
    /* now sent in shared memory bytes */
        *(BYTE *)(SBASE+RX_TIMOFF+which) = chips;
    }                /* end of process_timing_offset*/
```

Copyright© 1996 by Lockheed Martin Corporation. All rights reserved.

Figure 7:
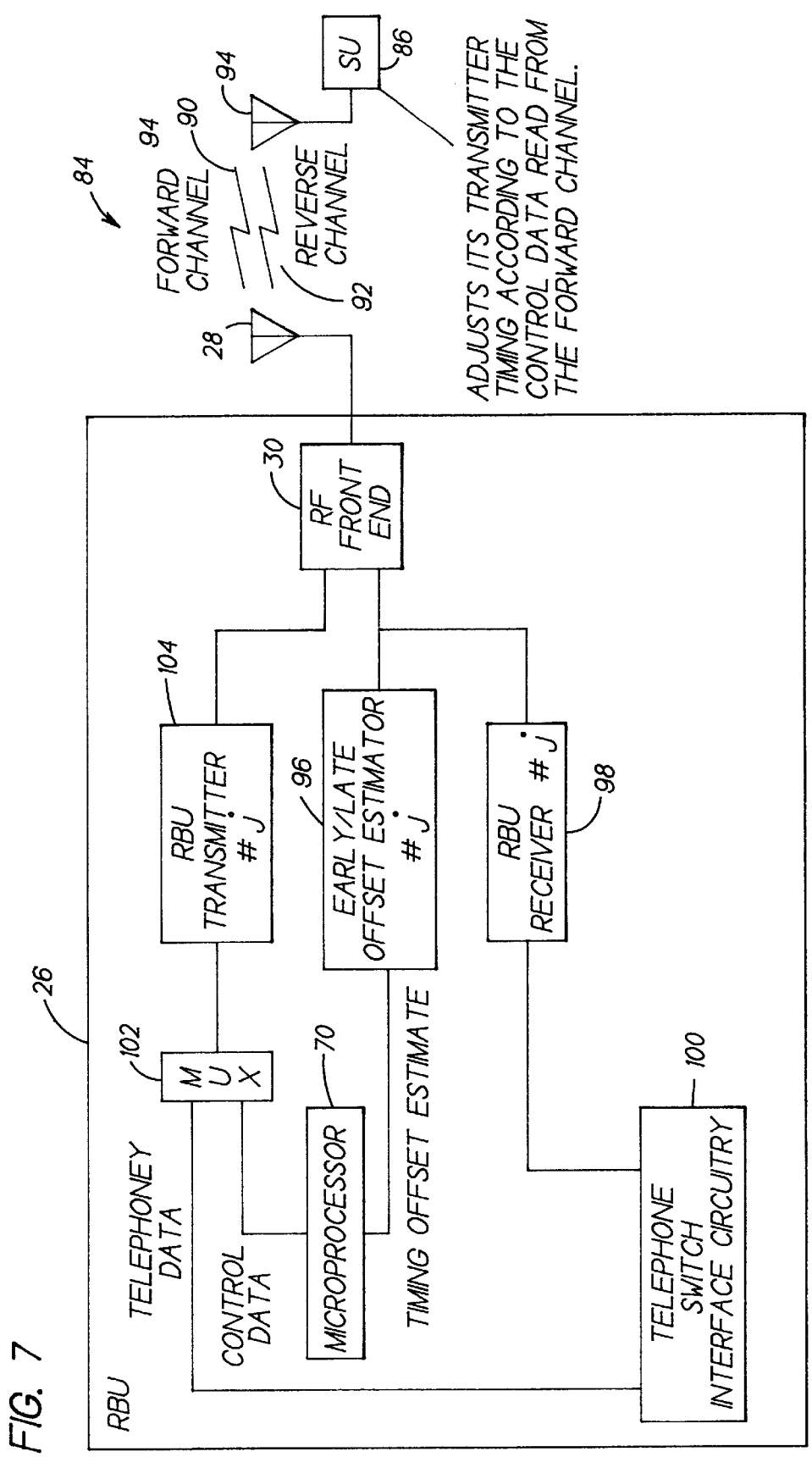
FIG. 7 is a high-level block diagram of a timing control loop of a communications system such as the system of FIG. 1.

Once the offset has been determined and a decision has been made to not squelch that offset estimate, the offset estimate is then provided to the subscriber unit via the forward channel from the RBU to the SU. A high-level block diagram of the timing control loop thereby created is shown in FIG. 7. System 84 of FIG. 7 (which can correspond to system 10 of FIG. 1 and FIG. 1A) includes a subscriber unit 86 (corresponding to user k), an RBU 26, and a forward channel 90 and a reverse channel 92 linking them via respective antennas 94 and 28. Subscriber unit 86 provides a data signal via its antenna 94, reverse channel 92 and antenna 28 to RF front end 30 of RBU 26. Early/late offset estimator 96 provides a timing offset estimate to microprocessor 70. The early/late offset estimator 96 functions as described above for receiver 36 of FIG. 2. However, receiver 36 of FIG. 2 also produces an on-time despread signal as an additional output from on-time despreader 42. That function is illustrated by RBU receiver 98. The despread signal is provided to typical telephone switch interface circuitry 100, which operates as a switch interface for telephone calls in a manner well known in the art. Telephone calls being handled via RBU 26 to subscriber unit 86 are provided to multiplexer 102. Multiplexer 102 receives both telephony data from switch interface 100 and control data resulting from the timing offset estimate from processor 70, and multiplexes that data to RBU transmitter 104, which spreads the multiplexed signal before providing it to RF front end 30 for transmission via antenna 28, forward channel 90 and antenna 94 to subscriber unit 86. Any offset correction information generated by microprocessor 70 is then used by subscriber unit 86 to adjust its transmitter accordingly. Subscriber unit 86 adjusts its transmitter timing according to the control data read from forward channel 90.

U.S. patent application Ser. No. 08/606,285 and U.S. patent application Ser. No. 08/606,378 describe how to obtain initial synchronization of the subscriber unit both in the forward channel which is the base station to subscriber link, and also in the reverse channel which is the subscriber to base station link. System 10, and system 84, can be synchronized thereby, to thereby have a plurality of subscriber units that are transmitting very nearly in synchronization but may be off by some fraction of a chip. Each subscriber unit 14, 86, etc. transmits data digitally, as positive ones or negative ones, or as ones and zeros, or in some other manner. A pseudonoise code or signature sequence is impressed upon those data bits that are being transmitted from each respective subscriber unit. Each user, and thus each subscriber unit, has a distinct signature sequence which would preferably be made up also of positive ones and negative ones, or ones and zeros, or the like. The data signal is passed through a multiplier before being provided to a transmitter. That multiplier multiplies the plus one-minus one sequence of data with a very high frequency alternating plus one-minus one sequence of chips which constitutes the PN code or signature sequence. The PN code or signature sequence is made up of a series of chips, with each chip being basically a period or a time-portion of the waveform during which the signature sequence takes on a value of plus one or minus one (or the like), but does not switch. The PN code is held constant for the duration of a chip. There can be many chips per bit. For example, a single bit could be multiplied by 128 chips for each bit, so that the chip rate is 128 times the bit rate. Thus, the PN code is a much higher frequency signal that is multiplied together with the data signal to produce a signal which, once so spread, looks like the PN code only it is either the PN code or the inverse of the PN code, depending on whether the user is sending a plus one or a minus one bit during that particular bit time. The alternating plus one-minus one waveform is then upconverted with a carrier and then transmitted. One way in which this can be accomplished is QPSK modulation, in which both an in-phase signal and a quadrature signal (a signal in quadrature relationship with the in-phase signal) are being transmitted which are distinguished by having the upconversion process on the in-phase channel use a cosine at the carrier frequency and having the upconversion for the quadrature signal involve multiplying the quadrature data stream by a sine rather than a cosine at the carrier frequency. By using this QPSK modulation format, it is possible to essentially double the amount of data that is being provided through the reverse channel by sending a distinct bit on the I channel versus the Q channel. Using cosine and sine carriers for those channels respectively provides an extra dimension of orthogonality to avoid interference between the two channels. In synchronous CDMA, subscriber units are transmitting signals in the form of spread waveforms which are synchronized to within perhaps a chip or a fraction of a chip of each other, so that they are very close to being chip and bit aligned. Nonetheless, there is a need to ensure that the users stay synchronized. By estimating the offset of a received signal and providing appropriate feedback to the subscriber unit, it is possible to ask the subscriber unit to adjust its transmit time or phase slightly to make sure that that subscriber unit stays completely aligned. This is accomplished using the early-late gate synchronizing scheme shown in FIG. 2. The signal coming in to the base station is an aggregate signal which has the sum of all of the signals from all of the users, for example in a cell of a cellular telephone system. The system of FIG. 2 samples that aggregate signal after it is downconverted through RF front end 30 to produce a signal that is at or very close to baseband. That signal is then sampled N times per chip, where N is any positive integer but can for example be 2. If for example there are 128 chips per bit, and the signal is sampled 2 times per chip, then that signal is being sampled 256 times per bit. For example, an incoming signal from a subscriber unit to an RBU may have some phase associated with it that was off by a small fraction of a chip. For N=2, 256 samples would be taken from each bit, which should span the bit. For a perfectly synchronized signal, at receiver 36 the first and second samples would show the first chip of the received waveform. However, if the user sending that signal is off synchronization by a sample, it might be that the first sample made at receiver 36 would actually be the 256th half chip of the previous bit and the second sample would instead be the first half chip of the new bit, while the third sample would be the second half chip of the new bit, and so forth. Accordingly, it is necessary to be able to identify whether an incoming signal is properly synchronized and to accomplish proper synchronization of one or more subscriber units.

To address this problem, receiver 36 includes not only on-time despreader 42, but also early despreader 44 and late despreader 46. However, when early despreader 44 and late despreader 46 provide a power estimate, it is a noisy estimate, because it has Gaussian noise on top of it and it may also have channel fading, etc., thereby perturbing the power estimates so provided. FIG. 3 shows a triangle autocorrelation function. In FIG. 2, the early sample value E and the late sample value L are shown as being at different heights because the autocorrelation function for the signals that are being received is triangular within about plus or minus one chip of the correct alignment. For this reason, the peak of the triangle autocorrelation function shown in FIG. 2, also referred to as an autocorrelation peak P, is used to synchronize the signal received from the subscriber unit. The energy in the on-time sample O is very near the top of the peak P, but early sample E is about halfway down from the peak and late sample L is even farther down from the peak. For N=2, there are two samples per chip, so that the spacing of samples E, O and L would be half a chip apart. By looking at the difference between early sample E and late sample L, notwithstanding that these are noisy estimates, a value of E–L can be obtained which can be used to estimate the offset using the expression offset=(E–L)/(20+E–L), where O represents the on-time sample value or height. If the value of the offset is desired, but the direction of the offset is not needed, then the absolute value of (E–L) could be substituted for the difference E—L. However, if it is necessary to know whether the offset is early or late, then the sign of the difference E–L should be preserved, and the absolute value of (E–L) should then not be used. E–L can be a negative number should E be below L. Since 20 should be considerably larger than E–L, a negative number in the denominator of the above expression would not result. Also, coarser synchronization provided by U.S. patent application Ser. No. 08/606,285 and U.S. patent application Ser. No. 08/606,378 would limit or reduce the amount of synchronization error. Using the expression offset equals (E–L)/(20+E–L) provides an offset estimate where an unfiltered PN code is employed for user k. However, each individual value so found may be noisy because E, O and L would each have noise superimposed thereon. However, the average of the noise is zero. To take advantage of this fact, several offset estimates are made, or several values of O and (E–L) are determined, and the results are averaged over a period of time. The longer the period of time over which offset estimates are made and averaged, or values of O and (E–L) determined and averaged, the more that the noise value will be averaged down to a low value. If many such estimates or values are averaged, then the noise in the resulting averaged offset estimate will convert to an arbitrarily small error. Thus, any desired arbitrary accuracy can be obtained, depending on the time period over which the average(s) is or are made, without adding additional hardware such as would be employed in U.S. Pat. No. 5,446,727. In FIG. 2, this averaging is accomplished using accumulators 48 and 68 to average the values of O and of E–L respectively. As discussed above, each accumulator 48 and 68 accumulates values over M symbol intervals. For example, synchronization to within 1/32nd of a chip, 1/64th of a chip, 1/128th of chip or 1/1024th of a chip could be obtained. Averaging can for example be made over M=512 symbols, although averaging can take place over any desired number of symbols.

In FIG. 2, receiver 36 is receiver hardware dedicated to a single user k in system 10 or in system 84. There is a similar receiver in RBU 26 for each user or subscriber unit in system 10 or in system 84. In FIG. 2, the signal enters RBU 26 via antenna 28, from which the signal is provided to radio-frequency (RF) front end 30. The I and Q outputs of RF front end 30 are digitized by analog-to-digital converter 32. A/D converter 32 is clocked by a free running system clock 34 which does not necessarily have any time alignment with the received signals. The digitized I and Q signals produced by A/D converter 32 are then provided to the receiver, such as receiver 36, via bus 38. Receiver 36, and each such other receiver in RBU 26, is thereby provided with the sampled I and Q signals produced by A/D converter 32. As in the other receivers, receiver 36 phase shifts the sampled I and Q signals using digital phase shifter (DPS) 40. The output of DPS 40 is then provided to three different despreaders: on-time despreader 42, early despreader 44, and late despreader 46. Despreaders 42, 44 and 46 are distinguished by the extent to which the PN code generated by PN code generator 50 is staggered by delay 52 with or without delay 54. PN code generator 50 generates the PN code for user k. The PN code produced by PN code generator 50 passes through delay 52 and delay 54. The PN code for on-time despreader 42 is provided by the output of delay 52. The undelayed PN code produced at the output of generator 50 is provided directly to early despreader 44 via multiplier 58. The PN code passing through both delay 52 and delay 54 is provided to multiplier 60 and thus to late despreader 46. If system 10 or system 84 includes 120 subscriber units, then RBU 26 would include 120 receivers each basically identical to receiver 36 except for the PN code generated by generator 50. Each such receiver would include an early despreader, a late despreader and an on-time despreader to estimate the timing offset for its respective user. The resulting offset estimates once determined are (if not squelched) fed back via the forward channel as control information to the subscriber units, each offset estimate value being provided to the appropriate subscriber unit by application of its individualized PN code. If a subscriber unit is found to be off by 1/16th of a chip on the late side, for example, then the subscriber unit would use that information to speed up by an 1/16th of chip. The offset for that subscriber unit would again be estimated by the corresponding receiver of RBU 26 (such as receiver 36) once that subscriber unit has had a chance to correct synchronization. If the offset is now found to be 1/32nd of a chip on the early side, that information would be provided (subject to any squelch decision) to the subscriber unit to let the subscriber unit know that it should slow down by 1/32nd of a chip. Thus, there is a constant process of telling the subscriber units to become a little earlier or a little later in time than that particular subscriber unit currently is, using the offset estimator of FIG. 2. The offset expression given above can be found using the geometry of FIG. 3, as described above. Each receiver of the system of FIG. 2 (one of which is receiver 36) averages a despread on-time signal, and averages the difference between an early despread signal and a late despread signal, to estimate the offset of a particular subscriber unit. By averaging O and averaging E–L, an arbitrarily good estimate can be provided.

As discussed above, the subscriber units in a system can be synchronized initially to within about ½ chip of each other, in the manner shown in U.S. patent application Ser. No. 08/606,285 and U.S. patent application Ser. No. 08/606,378. With the system of FIG. 2, synchronization can be improved from that ½ chip offset down to zero offset and maintained there, even in a noisy environment.

As shown in FIG. 7, a timing control loop is provided wherein timing offsets are provided to the subscriber units. A squelch region is utilized to drop any timing offset estimate that is sufficiently small. If the timing offset estimate is smaller than some threshold which defines adequate synchronization for a particular situation, then it is unnecessary to send the update of the timing offset estimate to the corresponding subscriber unit. The preset threshold for squelch can for example be 1/16th of a chip, or 1/32nd of a chip, or some small number which is considered to indicate adequate synchronization. This squelch function is provided by processor 70 programmed with the software provided above. This squelch function limits the bandwidth used on the forward channel by not bothering to send offset estimates that are too small to be useful.

It should be understood that the specific numbers and values provided above are illustrative and not limiting, and that the present invention can be used with other numbers and values. Also, while the present invention can be particularly advantageously employed with synchronous CDMA communications systems, it can also provide synchronization for other systems.

Some of the many advantages of the invention should now be readily apparent. For example, apparatus and method have been provided for providing an accurate timing offset estimate. Use of a squelch function permits use of only a relatively small amount of the feedback channel bandwidth to convey the resulting timing information to the users. Thus, a timing control loop has been provided which is capable of synchronizing the signals of many users to within a very small fraction of a chip and providing, as a result, a very high degree of orthogonality among the users. The timing offset can be estimated to within an arbitrary degree of precision, depending on the integration time or averaging time of the accumulators 48 and 68.

Thus, there have been provided apparatus and method for providing an arbitrarily accurate estimate of timing offset between a transmitter of data and a receiver of same. Apparatus and method have also been provided for producing that estimate of timing offset using a relatively small amount of the feedback channel bandwidth. A timing control loop capable of synchronizing users' signals to within a very small fraction of a chip is also provided.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. Apparatus for determining an offset of a spread spectrum signal spread with a pseudonoise code, comprising:
   a pseudonoise code generator for generating the pseudonoise code;
   delay means, receiving the pseudonoise code from said pseudonoise code generator, for generating a first plurality of delayed pseudonoise codes each delayed by a different amount;
   a first despreading means receiving the spread spectrum signal and receiving the pseudonoise code from said pseudonoise code generator, for producing a first despread signal;
   a first plurality of despreading means, each of said first plurality of despreading means receiving the spread spectrum signal and receiving a respective one of said first plurality of delayed pseudonoise codes for producing a first plurality of despread signals; and
   a processor, receiving the first despread signal and the first plurality of despread signals, for combining the despread signals to produce an offset signal.

2. A method for reducing a timing offset in a radio signal transmitted from a first radio unit to a second radio unit, comprising steps of:
   transmitting the radio signal from the first radio unit to the second radio unit;
   receiving the transmitted radio signal at the second radio unit;
   despreading the received radio signal using a despreading code, a once delayed version of the despreading code, and a twice delayed version of the despreading code to generate corresponding first, second and third despread signals;
   computing a timing offset of the received radio signal in accordance with the corresponding first, second and third despread signals; and
   transmitting a timing offset correction signal to the first radio unit from the second radio unit.

3. A method as in claim 2, wherein the transmitted radio signal is a direct sequence, code division multiple access (DS-CDMA) radio signal.

4. A method as in claim 3, wherein the despreading code is a pseudo-noise code.

5. A method as in claim 3, wherein the once delayed version of the despreading code and the twice delayed version of the despreading code are each offset from the despreading code by a fraction of a chip.

6. A method as in claim 2, wherein the step of despreading is performed at periodic intervals, and wherein the step of computing includes a step of averaging a plurality of despread signals obtained over a plurality of the periodic intervals.

7. A method as in claim 2, wherein the first despread signal is an early despread signal (E), wherein the second despread signal is an on-time despread signal (O), and wherein the third despread signal is a late despread signal (L), and wherein the. step of computing computes the timing offset in accordance with the expression:

$$(E-L)/(20+((\text{absolute value})E-L)).$$

8. A method as in claim 7, wherein the step of despreading is performed at periodic intervals, and wherein the step of computing includes a preliminary step of averaging a plurality of O and (E−L) signals.

9. A method as in claim 2, and comprising an initial step of coarse synchronizing the timing of the first radio unit to the second radio unit.

10. A method as in claim 2, wherein the step of transmitting the timing offset correction signal is performed if the computed timing offset is greater than a timing offset threshold value.

11. A method as in claim 2, wherein the steps of receiving, despreading, computing and transmitting the timing offset correction signal are performed in parallel for a plurality of first radio units.

12. A method for reducing a timing offset in a direct sequence, code division multiple access (DS-CDMA) radio signal transmitted from a first radio unit to a second radio unit, comprising steps of:
   transmitting the radio signal from the first radio unit to the second radio unit;
   receiving the transmitted radio signal at the second radio unit;
   despreading, at periodic intervals, the received radio signal using a pseudo-noise (PN) code, a once delayed version of the PN code, and a twice delayed version of the PN code to generate corresponding first, second and third despread signals, wherein the once delayed version of the PN code and the twice delayed version of the PN code are each offset from the PN code by a fraction of a chip;
   computing a timing offset of the received radio signal in accordance with the corresponding first, second and third despread signals, the step of computing including a step of averaging a plurality of despread signals obtained over a plurality of the periodic intervals; and
   transmitting a timing offset correction signal to the first radio unit from the second radio unit.

13. A method as in claim 12, wherein the first despread signal is an early despread signal (E), wherein the second despread signal is an on-time despread signal (O), and wherein the third despread signal is a late despread signal (L), and wherein the step of computing computes the timing offset in accordance with the expression:

$$(E-L)/(20+((\text{absolute value})E-L)).$$

14. A method as in claim 13, wherein the step of averaging averages a plurality of O and (E−L) signals.

15. A method as in claim 12, and comprising an initial step of coarse synchronizing the timing of the first radio unit to the second radio unit.

16. A method as in claim 12, wherein the step of transmitting the timing offset correction signal is performed if the computed timing offset is greater than a timing offset threshold value.

17. A method as in claim 12, wherein the steps of receiving, despreading, computing and transmitting the timing offset correction signal are performed in parallel for a plurality of first radio units.

* * * * *